3,021,325
CARBAMYL SUBSTITUTED 2,3,4,5-TETRAHYDRO-BENZODIAZEPINE COMPOUNDS
Otis E. Fancher, Gust Nichols, and Dale A. Stauffer, Elkhart, Ind., assignors to Miles Laboratories, Inc., Elkhart, Ind., a corporation of Indiana
No Drawing. Filed Apr. 15, 1959, Ser. No. 806,436
7 Claims. (Cl. 260—239)

This invention relates to novel chemical compounds, to pharmaceutical compositions therewith and to methods for their use. Particularly, the invention relates to new compositions of matter which have sedative activity and which are generally useful in alleviation of nervous tension and anxiety in human beings.

The compounds of this invention may be generally described as carbamyl derivatives of 2,3,4,5-tetrahydro-1,5-benzodiazepines and may be represented by the following structural formula:

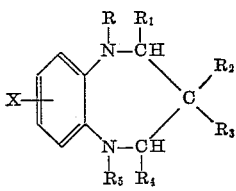

In the formula X represents hydrogen, halogen and lower alkyl groups, R stands for the group —$CONH_2$, $R_5$ is hydrogen, $R_1$, $R_2$, $R_3$ and $R_4$ represent hydrogen or lower alkyl radicals.

The ensuing description of the various compounds of our invention can best be followed by using the diagrammed 1,5-bendodiazepine nucleus as a referent:

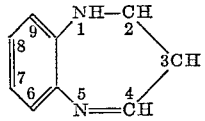

A detailed description of methods of preparing these compounds is set forth in the following examples:

EXAMPLE I

*1-carbamyl-2-methyl-2,3,4,5-tetrahydro-1,5-benzodiazepine*

(A) A mixture of 2-methyl-4-oxo-2,3,4,5-tetrahydro-1,5-benzodiazepine (35.2 g., 0.2 mole) (prepared according to a procedure described by Ried and Urlass, Ber., 86, 1101 (1953)), nitrourea (25.2 g., 0.24 mole) and 150 ml. of absolute ethanol was heated at 70° for three hours. Most of the solid material dissolved and the crystals began to separate from the solution. Then the mixture was heated under reflux for four hours. After thoroughly cooling, the crystals were collected, washed with cold absolute ethanol and dried. The white crystals (28.3 g., 65%) melted at 244–245°.

Analysis.—Calcd. for $C_{11}H_{13}N_3O_2$: N, 19.17. Found: N, 18.92.

(B) A suspension of lithium aluminum hydride (11.4 g., 0.3 mole) in tetrahydrofuran (250 ml.) was stirred, while 1-carbamyl-2-methyl-4-oxo-2,3,4,5-tetrahydro-1,5-benzodiazepine (43.8 g., 0.2 mole) was added portionwise over a thirty-minute period. After stirring for another thirty minutes at room temperature, the thick mixture was diluted with an additional 100 ml. of tetrahydrofuran and heated under gentle reflux for one hour. The mixture was cooled to room temperature and 12 ml. of water was added cautiously. Then 9 ml. of 20% sodium hydroxide was added and followed by 42 ml. of water. The salts were removed by filtration and washed with tetrahydrofuran. The combined filtrates and washings were dried over magnesium sulfate and the solvent was removed by distillation. The residue was heated to boiling with 200 ml. of benzene, and the crystals which did not dissolve were collected, washed with water and dried. The product (22.4 g., 55%) melted at 191–192°.

Analysis.—Calcd. for $C_{11}H_{15}N_3O$: N (basic), 6.82. Found: N (basic), 6.82.

*Alternate procedure for preparing 1-carbamyl-2-methyl-2,3,4,5-tetrahydro-1,5-benzodiazepine*

(1) *1-benzyl-4-methyl-2,3,4,5-tetrahydro-1,5-benzodiazepine.*—2-methyl-2,3,4,5-tetrahydro-1,5- benzodiazepine (60 g., 0.37 mole) (obtained by first reducing the above 2-methyl-4-oxo-2,3,4,5-tetrahydro - 1,5 - benzodiazepine), benzyl chloride (47 g., 0.37 mole) and 500 ml. of absolute ethanol were heated under reflux for two hours. After standing overnight the alcohol was removed by distillation, and the residue was shaken with 200 ml. of ether and 300 ml. of water. Then the mixture was made alkaline with aqueous sodium hydroxide. The ether layer was withdrawn, dried over magnesium sulfate and fractionally distilled. The 1-benzyl-4-methyl-2,3,4,5-tetrahydro-1,5-benzodiazepine (34.1 g., 53% based on the starting material not recovered) was collected at 162–163° under 0.4 mm.

Analysis.—Calcd. for $C_{17}H_{20}N_2$: N, 11.10. Found: N, 11.18.

(2) *5-benzyl-1-carbamyl-2-methyl-2,3,4,5 - tetrahydro-1,5-benzodiazepine.*—1-benzyl-4-methyl-2,3,4,5 - tetrahydro-1,5-benzodiazepine (33.5 g., 0.133 mole) and nitrourea (16.8 g., 0.16 mole) were mixed in 75 ml. of warm isopropanol. The mixture was heated just short of reflux for two hours and then under reflux for two hours. The solvent was removed by distillation and the syrupy residue was crystallized from a mixture of benzene and Skellysolve "C." The crude product (36.7 g., 94%) melted at 135–138°. Recrystallization from ethyl acetate gave 20.7 g. (53%) of the 5-benzyl-1-carbamyl-2-methyl-2,3,4,5-tetrahydro-1,5-benzodiazepine which melted at 143–144°. An additional quantity (10.5 g.) of less pure (M.P. 120–130°) material was recovered from the mother liquor.

Analysis.—Calcd. for $C_{18}H_{21}N_3O$: N (basic), 4.74. Found: N (basic), 4.78.

(3) *1-carbamyl-2-methyl-2,3,4,5-tetrahydro-1,5-benzodiazepine.*—Three grams of palladium chloride on Darco G-60 (5% Pd) mixed with 100 ml. of isopropanol was reduced by shaking under three atmospheres of hydrogen for a few minutes. Then 5-benzyl-1-carbamyl-2-methyl-2,3,4,5-tetrahydro-1,5-benzodiazepine (9 g., 0.03 mole) was added, and the mixture was shaken under three atmospheres of hydrogen. The theoretical quantity of hydrogen was taken up in 45 minutes. The mixture was acidified with 1:1 hydrochloric acid to dissolve the crystals which had separated out. The catalyst and carbon were filtered off through a sintered glass filter. The solvent was removed by distillation and the residue was taken up in dilute hydrochloric acid. The solution was clarified with carbon and the free base was liberated with potassium carbonate. The 1-carbamyl-2-methyl-2,3,4,5-tetrahydro-1,5-benzodiazepine (4.9 g., 71%) melted at 192–193°.

Analysis.—Calcd. for $C_{11}H_{15}N_3O$: N (basic), 6.82. Found: N (basic), 6.86.

EXAMPLE II

*1-carbamyl-4-methyl-2,3,4,5-tetrahydro-1,5 benzodiazepine*

About 162.2 g. of 2-methyl-2,3,4,5-tetrahydro-1,5- benzodiazepine (see Example I, Alternate Procedure, Step 1) in 500 ml. of isopropanol was treated with 115.6 g. of nitrourea which was added in one portion. The mixture was warmed until the reaction started and heat was applied intermittently thereafter to sustain the reaction so that there was a vigorous evolution of nitrogen. After about one hour the spontaneous reaction was complete and the mixture was heated at gentle reflux for fifteen minutes. Sufficient isopropanol was added so that the solid material dissolved completely in the hot mixture. The dark red solution was clarified with decolorizing carbon, concentrated to 500 ml. and set aside to crystallize. The crude product weighed 153 g., 75%, and melted at 155–165°.

This was dissolved in hot methanol, carboned and treated with an excess of methanolic hydrogen chloride. The solution was concentrated by boiling and isopropanol was added from time to time until crystals began to form. There was obtained 159 g. of crystalline hydrochloride which melted at 223°.

*Analysis.*—Calcd. for $C_{11}H_{16}ClN_3O$: Cl, 14.67. Found: Cl, 14.73.

EXAMPLE III

*1-carbamyl-2,4-dimethyl-2,3,4,5-tetrahydro-1,5 benzodiazepine*

About 45 g. (0.256 mole) of 2,4-dimethyl-2,3,4,5-tetrahydro-1,5-benzodiazepine was dissolved in 200 cc. of isopropanol, treated with 30 g. (0.286 mole) of nitrourea and heated to 70°. After the evolution of gas had subsided the mixture was refluxed for one hour. The solvents were removed under reduced pressure and the residue was dissolved in 250 cc. of 1N HCl and filtered to remove insoluble material. The filtrate was made alkaline with $K_2CO_3$. The solid which separated was filtered, washed free of alkali and crystallized from 200 cc. of isopropanol. There was obtained 26.5 g. (47%) of product melting at 214–216°.

*Analysis.*—Calcd. for $C_{12}H_{17}N_3O$: N, 6.39. Found: N, 6.38.

The free base dissolved in methanol was treated with anhydrous HCl in isopropanol. The hydrochloride which crystallized melted at 192–194°.

*Analysis.*—Calcd. for $C_{12}H_{18}ClN_3O$: N, 5.48; Cl, 13.86. Found: N, 5.37; Cl, 13.62.

The starting material in this experiment was prepared by reacting o-phenylenediamine with acetylacetone (2,4-pentanedione) to yield 2,4-dimethyl-1,5,3-benzodiazepine according to a procedure described by Thiele and Steimig, Ber. 40, 955 (1907). The unsaturated intermediate was then hydrogenated in the presence of a platinum oxide catalyst to give 2,4-dimethyl-2,3,4,5-tetrahydro-1,5-benzodiazepine.

EXAMPLE IV

*1-carbamyl-3-ethyl-2,3,4,5-tetrahydro-1,5-benzodiazepine*

This compound was prepared from 3-ethyl-2,3,4,5-tetrahydro-1,5-benzodiazepine and nitrourea. The product melts at 131–133°.

*Analysis.*—Calcd. for $C_{12}H_{17}N_3O$: N (basic), 6.39. Found: N (basic), 6.28.

The saturated 3-ethyl substituted benzodiazepine compound was obtained by first reacting o-phenylenediamine with 2-ethyl substituted malonic ester and then reducing the intermediate 3-ethyl-2,4-dioxo-2,3,4,5-tetrahydro-1,5-benzodiazepine with lithium aluminum hydride.

EXAMPLE V

*1-carbamyl-2,3,4-trimethyl-2,3,4,5-tetrahydro-1,5-benzodiazepine*

This was prepared from 2,3,4-trimethyl-2,3,4,5-tetrahydro-1,5-benzodiazepine and nitrourea. It melts at 171–172°.

*Analysis.*—Calcd. for $C_{13}H_{19}N_3O$: N (basic), 6.01. Found: N (basic), 5.98.

The trimethyl benzodiazepine derivative was obtained by a method analogous to that described in Example III with the starting materials being o-phenylenediamine and 3-methyl-2,4-pentanedione.

EXAMPLE VI

*1-carbamyl-2,3,4,5-tetrahydro-1,5-benzodiazepine*

This compound was prepared from 46 g. (0.438 mole) of nitrourea and 58 g. (0.3914 mole) of 2,3,4,5-tetrahydro-1,5-benzodiazepine as described previously. There was obtained 51 g., 68%, of product melting at 172–174°. This was converted to the monohydrochloride as above and recrystallized from a mixture of methanol and isopropanol; M.P. 211–213°.

*Analysis.*—Calcd. for $C_{10}H_{14}ClNO_3$: Cl, 15.57; N (basic), 6.15. Found: Cl, 15.40, N (basic), 6.12.

2,3,4,5-tetrahydro-1,5-benzodiazepine was synthesized as follows: o-phenylenediamine was treated with p-toluenesulfonyl chloride to give N,N'-bis-p-toluenesulfonyl-o-phenylenediamine, which was refluxed with trimethylenedibromide to yield a saturated 1,5-di-p-toluenesulfonyl-1,5-benzodiazepine. By hydrolysis 2,3,4,5-tetrahydro-1,5-benzodiazepine was then obtained.

EXAMPLE VII

*1-carbamyl-8-chloro-2-methyl-2,3,4,5-tetrahydro-1,5-benzodiazepine*

(A) Crotonic acid, 70 g. (0.814 mole) and 100 g. (0.701 mole) of p-chloro-o-phenylenediamine were heated at 170–180° for one hour and the reaction product, 8-chloro-2-methyl-4-oxo - 2,3,4,5-tetrahydro-1,5-benzodiazepine, was crystallized from xylene to give 50 g. (30%) of product melting at 193–195°.

*Analysis.*—Calcd. for $C_{10}H_{11}ClN_2O$: N (basic), 6.65. Found: N (basic), 6.68.

(B) The amide, 42.1 g. (0.2 mole), and 21 g. (0.2 mole) of nitrourea in 500 ml. of isopropanol were heated to reflux. After one hour an additional 21 g. of nitrourea was added, and after three hours another 21 g. of nitrourea was added and the mixture was refluxed overnight. Crystallization of the product from diethyleneglycol dimethyl ether gave 34 g. of 1-carbamyl-8-chloro-2-methyl-4-oxo-2,3,4,5 - tetrahydro-1,5 - benzodiazepine which melted at 237–238°.

*Analysis.*—Calcd. for $C_{11}H_{12}ClN_3O_2$: N, 16.57. Found: N, 16.55.

(C) Reduction of the amide, 34 g., with 10 g. of lithium aluminum hydride in 500 ml. of tetrahydrofuran gave on working up in the well-known manner 12 g. (37%) of product melting at 201–203°.

*Analysis.*—Calcd. for $C_{11}H_{14}ClN_3O$: N (basic), 5.84. Found: N (basic), 5.74.

EXAMPLE VIII

*1-carbamyl-8-chloro-2,4-dimethyl-2,3,4,5-tetrahydro-1,5-benzodiazepine*

This compound was prepared from 2,4-dimethyl-8-chloro-2,3,4,5-tetrahydro-1,5-benzodiazepine and nitrourea. The product melts at 219–221°.

*Analysis.*—Calcd. for $C_{12}H_{16}ClN_3O$: N (basic), 5.52. Found: N (basic), 5.61.

EXAMPLE IX

*1-carbamyl-2,4,8-trimethyl-2,3,4,5-tetrahydro-1,5-benzodiazepine*

This was prepared from 2,4,8-trimethyl-2,3,4,5-tetrahydro-1,5-benzodiazepine and nitrourea. The product melts at 204–207°.

*Analysis.*—Calcd. for $C_{13}H_{19}N_3O$: N (basic), 6.01. Found: N (basic), 6.02.

Compositions which are useful in the practice of our invention are conveniently and easily produced by combining a compound of the class hereinbefore described with fillers, carriers, extenders and/or excipients, such as are generally used in the preparation of pharmaceutical products which are to be taken orally or given parenterally, especially for human use. The compounds may be used in the form of the free base or of the salts of acids which are water-soluble and non-toxic, such as the hydrochloride, sulfate and the like. The compositions may be either in solid or liquid state and may be compounded as tablets, powders, capsules, suspensions and similar dosage forms, particularly useful for oral ingestion. In such form the composition may be prepared by mixing the foregoing compounds either in the form of a free base or the water-soluble non-toxic salt, with such common diluents or tabletting adjuncts as cellulose powder, cornstarch, lactose, talc, stearic acid, magnesium stearate, gums and the like, in accordance with conventional manufacturing practices common in the art.

Where the product is to be administered parenterally, the compounds, preferably in the form of their non-toxic water-soluble salts, may be associated with such carriers as water, saline solution, glucose solution and the like.

We have found that for oral administration a suitable dosage unit is from about 50 to 300 milligrams of the compound per tablet, capsule or other dosage form. Where the material is to be administered parenterally, then a suitable dosage unit would be from about 25 to 300 milligrams of the active ingredient.

Dosages as above described may be administered as frequently as conditions demand and it is understood, of course, that for children the dosages are correspondingly smaller, depending upon the age and weight of the child, as those skilled in the art will appreciate.

The following examples will illustrate in detail typical procedures for preparing a number of representative dosage unit forms of our compositions in accordance with this invention:

EXAMPLE X

A pharmaceutical composition having the following formulation was prepared:

|  | Mg. |
|---|---|
| 1-carbamyl-4-methyl - 2,3,4,5 - tetrahydro-1,5-benzodiazepine | 50.0 |
| Lactose | 200.0 |
| Magnesium stearate | 5.0 |

The benzodiazepine derivative is mixed with the lactose and thoroughly wetted with water. The wetted material is then pressed through a sieve of the desired size and dried in an oven at about 140° F. When dry, the magnesium stearate is added, and the composition is dry-mixed thoroughly. The mixed material is then compressed into tablets.

It will be understood that the above example is only representative of one specific form of this invention. Other excipients such as sucrose, sodium chloride, kaolin, dicalcium phosphate and the like may be used. The excipient may be present in amounts varying from about 30 to 300 parts by weight, depending upon the final formulation. Instead of magnesium stearate as the lubricant, stearic acid, boric acid and the like are operable. For best results from about 2 to 10 parts by weight of the lubricant is used. It will be understood that any of the diazepine derivatives described above may be used as the active ingredient of the composition. Depending on the dosage unit desired, from 50 to 300 parts of the desired compound will be used.

EXAMPLE XI

For capsules the following formulations was used:

|  | Mg. |
|---|---|
| 1-carbamyl-2-methyl-2,3,4,5-tetrahydro - 1,5-benzodiazepine | 500.0 |
| Lactose | 1000.0 |
| Talc | 75.0 |

This material was prepared as described in Example X above, that is, the diazepine derivative and the lactose were wetted, sieved, dried and mixed with the talc. Capsules each containing 50 mg. of the active ingredient were prepared.

Clinical evaluation of the compounds of this invention has established their utility as sedative agents. For example, the compound of Example II, 1-carbamyl-4-methyl-2,3,4,5-tetrahydro - 1,5 - benzodiazepine has been administered orally to 22 mentally retarded patients in dosages from 50 mg. daily to 800 mg. three times daily. The optimal activity dose has been found to be approximately 600 mg. t.i.d. The compound has been found to have a decided calming effect on behavior of an overactive caliber and on mildly overactive and aggressive patients the compound tends to reduce the activity as well as increase mental acuity, that is, the patient is less active, more cheerful, and better able to participate in activities. To date there have been no observable side reactions in patients being treated with this drug such as drooling, nasal congestion, diarrhea, photophobia, convulsions, ataxia, Parkinson-like gait, lethargy, sleepiness or confusion which is so often recorded for similar sedatives. Repeated laboratory tests have demonstrated no abnormal changes in the number or relationship of the hemapoietic elements, the NPN, thymol turbidity, alkaline phosphatase or urinalyses in patients being treated with the compound.

This application is a continuation-in-part of application Ser. No. 701,678, filed December 9, 1957, now abandoned.

What is claimed is:

1. The carbamyl substituted benzodiazepine derivative of the formula:

[Structural formula showing benzodiazepine with CONH$_2$, R$_1$, R$_2$, R$_3$, R$_4$ substituents and X on the benzene ring]

wherein $R_1$, $R_2$, $R_3$ and $R_4$ are selected from the group consisting of hydrogen and lower alkyl and wherein X is selected from the group consisting of hydrogen, halogen and lower alkyl.

2. 1 - carbamyl-2-methyl - 2,3,4,5 - tetrahydro-1,5-benzodiazepine.

3. 1 - carbamyl-4-methyl - 2,3,4,5 - tetrahydro-1,5-benzodiazepine.

4. 1-carbamyl-2,4-dimethyl - 2,3,4,5 - tetrahydro - 1,5-benzodiazepine.

5. 1-carbamyl-3-ethyl - 2,3,4,5 - tetrahydro-1,5-benzodiazepine.

6. 1-carbamyl-8-chloro-2-methyl - 2,3,4,5 - tetrahydro-1,5-benzodiazepine.

7. 1-carbamyl-2,3,4,5-tetrahydro-1,5-benzodiazepine.

References Cited in the file of this patent

UNITED STATES PATENTS

| 2,666,760 | Curtis et al. | Jan. 19, 1954 |
| 2,740,780 | Diamond | Apr. 3, 1956 |
| 2,854,379 | Fancher | Sept. 30, 1958 |
| 2,893,992 | Sternbach | July 7, 1959 |
| 2,899,359 | Fancher | Aug. 11, 1959 |